UNITED STATES PATENT OFFICE.

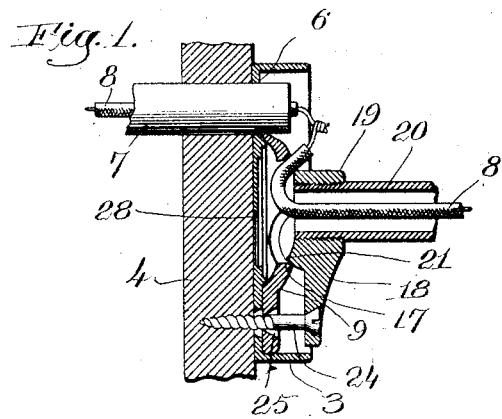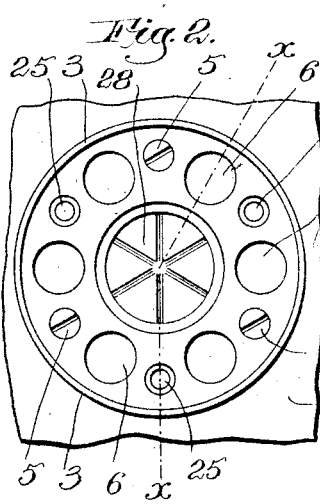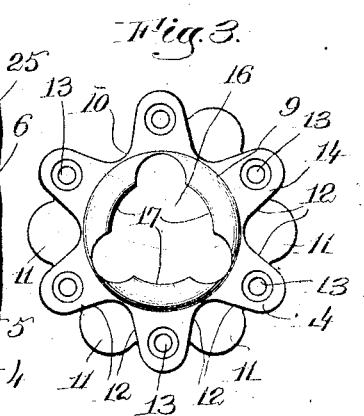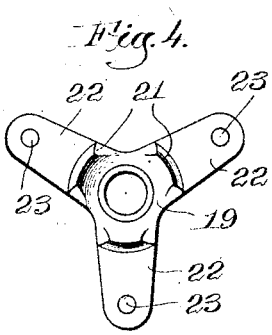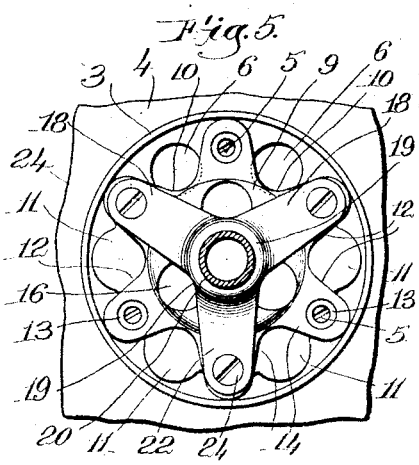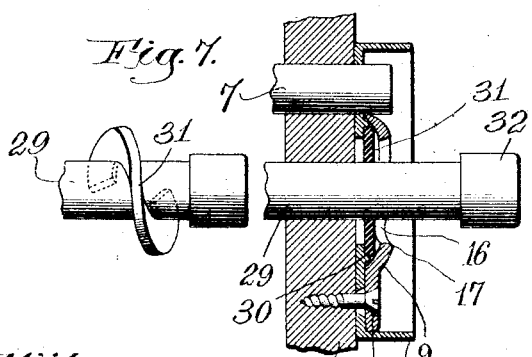

MINER ROBINSON, OF NEWTON, MASSACHUSETTS.

OUTLET-BOX.

1,143,322.　　　　Specification of Letters Patent.　　Patented June 15, 1915.

Application filed April 8, 1908. Serial No. 425,843.

*To all whom it may concern:*

Be it known that I, MINER ROBINSON, a citizen of the United States, residing at Newton, county of Middlesex, and State of Massachusetts, have invented an Improvement in Outlet-Boxes, of which the following description, in connection with the accompanying drawing, is a specification, like letters on the drawing representing like parts.

This invention relates to electrical outlet boxes and has for its object to provide a novel outlet box which can conveniently be used with any number of flexible wire-receiving conduits, which is provided with a novel device for clamping the conduits in place, which has such a construction that the electrical fixture may be supported independently of the outlet box, and which is adapted either for straight electrical work where the building is not piped for gas, or for combination electrical work where the building is piped for gas. One construction by which these and other objects are accomplished will be described and the novel points of the invention will then be pointed out in the claims.

In the drawings, Figure 1 is a section through the outlet box on the line x—x, Fig. 2, showing the manner in which it is used for straight electrical work; Fig. 2 is a view of the outlet box with the clamping ring removed; Fig. 3 is a view of the clamping ring; Fig. 4 is a view of the hickey; Fig. 5 is a front view of the outlet box with the clamping member and hickey therein; Fig. 6 is a section similar to Fig. 1 showing the outlet box as it will be used in combination electrical work where the building is piped for gas; Fig. 7 shows the manner of applying the washer to the pipe.

The outlet box is designated 3 and it is preferably of a symmetrical shape and is adapted to be fastened by screws 5 to a backing piece 4, such as that to which outlet boxes are generally attached.

My improved outlet box is provided with a plurality of apertures 6 for the reception of the usual conduits 7 through which the wires 8 extend. These apertures 6 are preferably symmetrically arranged in the box so that the conduits may be inserted in any one of the apertures desired. For clamping the conduits 7 in the apertures, I provide a clamping member 9 shown in Fig. 3. This clamping member is of a shape to fit the interior of the outlet box and is provided with one or more throats or recesses 10 adapted when said clamping member is placed in the box to engage the side of the conduit 7 and crowd the latter against the wall of the aperture 6 through which said conduit extends. This is accomplished by making the recesses 10 of such a shape and depth that when the clamping member is in place, the edge of said clamping member at the bottom of the recess extends slightly beyond the inner wall of the hole 6 as plainly seen in Fig. 5. This clamping member being of a size to fit the outlet box can be readily forced into the open front thereof, and when it is thus forced in it will clamp the conduits in place. The clamping member 9 will fit into the outlet box in any position, that is, said clamping member can be placed so that the recess 10 will engage and clamp a conduit in any one of the apertures 6. The clamping member is also so arranged that the clamping pressure thereof against the conduit is outward radially.

It is a requirement of fire underwriters that all unused apertures through the outlet box should be sealed and to accomplish this, I propose to make the clamping member 9 with sealing portions 11 which are arranged to cover the apertures when said clamping member is in place. These sealing portions are united to the body of the clamping member by lines of weakness 12 so that by striking any one of the sealing portions 11 a sharp blow, it will be broken from the body along the line of weakness. These lines of weakness are of such a shape that when any sealing portion is removed, a recess is formed similar to the recess 10. If, therefore, it is more convenient to place the flexible conduits 7 through two oppositely-disposed apertures 6, or if it is desired to lead into the outlet box three or more wires, then the appropriate sealing portions 11 can be knocked out of the clamping member thereby to uncover the apertures 6 required for receiving the flexible conduits. When the clamping member is in place, the sealing portions which are not broken out act to cover and seal the unused apertures 6, as above described. Since the clamping member fits closely the interior of the box, it is not essential that it be held in place, but I prefer to secure it by means of screws which may pass through apertures 13 in the arms or fingers 14 formed between the sealing portions 11.

The clamping member is open at its center portion, as at 16, and the wall surrounding the center portion is shaped to form a seat on which a hickey 18 is adapted to rest, said seat having such a construction as to permit the angular position of the hickey to be adjusted. The seat is shown as in the form of bearing edges 17. The hickey may be of any suitable construction and is provided with a central screw-threaded hub 19 into which the electrical fixture 20 may be screwed as usual.

One of the important features of my invention is that the hickey is adjustable so that the angular position of the fixture 20 may be changed without shifting the outlet box or putting any strain on either the outlet box or the means for securing it in place. For this purpose, the hub of the hickey is provided with rounding bearing surfaces 21 adapted to bear on the bearing edges 17 of the clamping member, as shown in Fig. 1, and the hickey is made with arms 22 having apertures 23 in their ends for the reception of screws or bolts 24 that may be used for securing the hickey in place. These screws 24 extend through the apertures 13 in the clamping member and through apertures 25 in the outlet box and into the backing piece 4. The hickey is, therefore, supported independently from the outlet box and the strain of the fixture is transferred from the hickey directly to the backing piece 4 and is not sustained by the outlet box.

The bearing between the hickey and the clamping member is a sort of ball-and-socket bearing, that is, the rounded surfaces 21 of the hickey correspond to the ball of a ball-and-socket joint, and the bearing edges 17 of the clamping member correspond to the socket of such a joint. This construction permits the hickey to be tipped in any direction relative to the clamping member and the outlet box, and therefore it is possible to set the hickey in the proper position to sustain the fixture 20 correctly, even though the outlet box is not set squarely. This I regard as important because it provides for securing a proper and correctly-positioned support for the fixture which is capable of adjustment independently of the outlet box and which is also sustained independently thereof.

The outlet box 3 is provided with a thin portion 28 in the central portion of its bottom which thin portion can be broken out by a sharp blow to leave an aperture through the outlet box for the reception of a gas pipe 29 in case the outlet box is used in a building which is piped for gas. The fire underwriters require that where the building is piped for gas, the gas pipe 29 shall be insulated from the outlet box, and in my improved device I accomplish this by providing the bottom of the box with a circular recess 30 adapted to receive a washer 31 of insulating material, which washer has an aperture therein of a size to receive the gas pipe 29. When a building is piped for gas, the projecting end of the gas pipe is always sealed with a cap 32 and to permit the washer 31 to be readily applied to the pipe without removing the cap, I propose to split said washer so that by opening the split ends away from each other, as shown in Fig. 7, it may be readily applied to the pipe behind the cap 32. This insulating washer is confined between the bottom of the box 3 and the clamping member 9. The aperture in it is of a size to just fit the pipe 29, and as said washer is confined in the recess 30 and is prevented from movement by the walls of the recess, said washer acts not only to insulate the pipe from the box, but also acts to center the pipe relative to the box. Another advantage of using the flat insulating washer, such as herein described, is that it affords a maximum amount of insulating distance between the gas pipe and the outlet box. Further, since said washer fits the pipe closely it acts to seal the space between the gas pipe and the walls of the aperture in the bottom of the box through which the pipe extends, thus obviating all danger of dust or sparks passing through said aperture. Where the outlet box is used for combination electrical work as shown in Fig. 6, the fixture may be supported directly on the gas pipe 29 without the use of the hickey.

I have not attempted to show or describe herein all forms of my invention, but have illustrated the preferred embodiment of my invention only.

Having fully described my invention, what I claim as new and desire to secure by Letters Patent is:—

1. The combination with an outlet box having a bottom and side walls and also having an aperture in its bottom for the reception of a wire-carrying conduit, of a conduit clamping member situated within said box and of a size and shape to engage the walls thereof at a sufficient number of points to be centered and held in position by said walls, said conduit-clamping member having a conduit-clamping edge adapted to engage a conduit occupying the aperture, said edge being spaced from the opposite edge of the aperture a distance in a radial direction slightly less than the normal diameter of the conduit whereby the conduit is clamped in place by the mere act of placing the clamping member in position.

2. The combination with an outlet box having an aperture in its bottom for the reception of a wire-carrying conduit, of a conduit-clamping member situated within said box and of a size and shape to fit and engage the interior walls of the box at a sufficient number of points to be centered and held in position by said walls, said member having a recess in its periphery to receive the conduit, the edge of said recess forming a conduit-clamping edge which is situated at a greater radial distance from the center of the box than the inner edge of the aperture whereby the act of placing the clamping member in the box forces the conduit outwardly in a radial direction and clamps it firmly against the outer wall of the aperture.

3. The combination with an outlet box having a plurality of apertures in its bottom for the reception of wire-carrying conduits, of a clamping member situated within and fitting the walls of the box, said clamping member being held in position by its engagement with said walls and having recesses to receive the conduits and engage the inner sides thereof, the walls of the recesses which engage the conduits being at a greater radial distance from the center of the box than the inner sides of the apertures whereby the mere act of placing the clamping member in the box will bring the walls of said recesses into clamping engagement with the conduits occupying the apertures in the box.

4. The combination with an outlet box having a symmetrical shape and provided with symmetrically-arranged apertures in its bottom, of a clamping member fitting the interior walls of the box and provided with sealing portions adapted to cover the apertures in the bottom of the box.

5. The combination with an outlet box having a symmetrical shape and provided with symmetrically-arranged apertures in its bottom, of a clamping member fitting the interior walls of the box and provided with sealing portions adapted to cover the apertures in the bottom of the box, said sealing portions being united to the body of the clamping member by lines of weakness whereby any sealing portion may be removed by a blow.

6. The combination with an outlet box having a symmetrical shape and provided with symmetrically-arranged apertures in its bottom, of a clamping member fitting the interior walls of the box and provided with sealing portions adapted to cover the apertures in the bottom of the box, said sealing portions being united to the body of the clamping member by lines of weakness whereby any sealing portion may be removed by a blow, the line of weakness uniting each sealing portion to the body having a shape to form a clamping edge to engage a wire-carrying conduit and clamp the latter in the aperture.

7. The combination with an outlet box having apertures for the reception of wire-carrying conduits, of a clamping member situated within the box for clamping the conduits thereto and having a seat for a hickey, a hickey engaging said seat, and means to adjustably sustain said hickey on its seat to permit its angular relation to the box to be varied.

8. The combination with an outlet box having apertures for the reception of wire-carrying conduits, of a clamping member situated within the box and adapted to clamp the conduits in said apertures, and a hickey resting against said clamping member and adjustable relative thereto.

9. The combination with an outlet box having in one wall thereof apertures for the reception of wire-carrying conduits, of means extending through said wall to secure the box to a backing board, a hickey within the box, and other means extending through said wall to secure the hickey to said board, which other means are independent from the box-sustaining means.

10. The combination with an outlet box having apertures for the reception of wire-carrying conduits, of a clamping member situated within the box for clamping the conduits thereto, said clamping member having a rounded hickey-receiving seat, a hickey engaging said seat, a hickey-securing means adapted to hold said hickey on its seat in various angular positions.

11. The combination with an outlet box having apertures for the reception of wire-carrying conduits, of a seat member within the box having on its outer side a hickey-receiving seat, a hickey engaging said seat, said hickey and seat having such relative shapes as to permit the hickey to rock on the seat, and screws extending through the hickey into the backing-board to which the outlet box is secured, said screws constituting means by which the hickey may be adjusted into different angular positions.

12. The combination with an outlet box having in the bottom thereof apertures for the reception of wire-carrying conduits, of means extending through said bottom to secure the box to a backing board, a hickey within the box, and other means extending through the box bottom to secure the hickey to said board, which other means are independent from the box-sustaining means.

In testimony whereof, I have signed my name to this specification, in the presence of two subscribing witnesses.

MINER ROBINSON.

Witnesses:
Louis C. Smith,
Thomas J. Drummond.